United States Patent [19]

Hoffman

[11] Patent Number: 5,297,026

[45] Date of Patent: Mar. 22, 1994

[54] SYSTEM FOR PROMOTING ACCOUNT ACTIVITY

[76] Inventor: Frank Hoffman, 1760 Willow Rd., Hillsborough, Calif. 94010

[21] Appl. No.: 816,675

[22] Filed: Jan. 3, 1992

[51] Int. Cl.$^5$ .............................................. G06F 15/20
[52] U.S. Cl. .................................... 364/408; 364/401
[58] Field of Search ........................ 364/401, 405, 408

[56] References Cited

U.S. PATENT DOCUMENTS

| | | | |
|---|---|---|---|
| 4,346,442 | 8/1982 | Musmanno | 364/408 |
| 4,742,457 | 5/1988 | Leon | 364/408 |
| 4,751,640 | 6/1988 | Lucas | 364/408 |

*Primary Examiner*—Roy N. Envall, Jr.
*Assistant Examiner*—Khai Tran
*Attorney, Agent, or Firm*—Thomas M. Freiburger

[57] ABSTRACT

A system and data processing arrangement for promoting purchases and account activity in a credit card account or other consumer transaction involving sales of goods or services rewards a customer for purchases by providing a high rate of return for funds invested by the customer. A financial institution, general purpose credit card agency, department store, automobile manufacturer, or various other marketers of goods or services agrees to grant the customer a high rate of interest on funds invested with the firm by the customer, provided the customer makes purchases. For purchases made by the customer in a given period (such as one month or six months), the firm gives the customer the right to invest a certain percentage (such as 10%) of the amount of purchases made by the customer in that period. Using automated data processing, the firm calculates the sum of the total purchases made by the customer during the preselected period. Then, funds are accepted from the customer up to the pre-agreed percentage of purchases, and provides a deposit account for the customer, crediting the investment funds in the deposit account. The firm may limit the term during which interest is paid on accepted funds invested for a particular such period, such as a term of six months or one year, or it may simply lower the interest rate at the end of that term.

10 Claims, 5 Drawing Sheets

**CURRENT INTEREST RATE 10.2%
APPLIED TO ALL INVESTMENT FUNDS
(RATE FLOATS WITH PRIME)**

DATE  1-31-92

INVESTED FUNDS LIQUIDATION DATES

| | INVESTMENT DATE | AMOUNT | INTEREST ACCRUED | LIQUIDATION DATES |
|---|---|---|---|---|
| A. | 1-3-91 | $365.00 | $23.60 | 6-30-92 |
| B. | 2-5-91 | $960.00 | $49.15 | 6-30-92 |
| C. | 3-2-91 | $200.00 | $14.90 | 6-30-92 |
| D. | 5-4-91 | $310.00 | $16.04 | 6-30-92 |
| E. | 7-6-91 | $200.00 | $12.86 | 12-31-92 |
| F. | 8-1-91 | $250.00 | $14.03 | 12-31-92 |
| G. | 9-4-91 | $100.00 | $4.60 | 12-31-92 |
| H. | 10-1-91 | $200.00 | $4.95 | 12-31-92 |
| I. | 11-4-91 | $100.00 | $2.08 | 12-31-92 |
| TOTALS | | $2685.00 | $142.21 | |

Fig. 4

DATE: JANUARY 25, 1992

|    | INVESTMENT DATE | AMOUNT | FIXED INTEREST RATE | INTEREST ACCRUED TO DATE | LOWER RATE EFFECTIVE |
|----|-----------------|--------|---------------------|--------------------------|----------------------|
| A. | 1-3-91          | $365.00 | 10.1%              | $37.50                   | 1-3-92               |
| B. | 2-5-91          | $960.00 | 9.9%               | $94.25                   | 2-5-92               |
| C. | 3-4-91          | $420.00 | 9.6%               | $36.75                   | 3-4-92               |
| D. | 7-5-91          | $150.00 | 9.1%               | $7.05                    | 7-5-92               |
| E. | 10-7-91         | $210.00 | 9.2%               | $7.60                    | 10-7-92              |
| F. | 11-6-91         | $100.00 | 9.0%               | $1.50                    | 11-6-92              |
| G. | 1-7-92          | $140.00 | 9.0%               | $1.05                    | 1-7-93               |
| TOTALS |             | $2345.00 |                   | $185.70                  |                      |

Fig. 5

SYSTEM FOR PROMOTING ACCOUNT ACTIVITY

BACKGROUND OF THE INVENTION

The invention relates generally to a system for promoting purchases in customer accounts such as credit card accounts, department store accounts and other consumer purchase transactions, with associated data processing.

Credit card firms such as Visa and MasterCard, automobile manufacturers, rental car companies, department stores, long distance telephone companies, financial institutions and other organizations have offered a number of different programs for promoting purchases of goods or services. These have included discount offers for certain catalog items, based on volume of activity in an account. Other promotional schemes have involved discounts on other goods or services, different from those purchased in the account. For example, discount coupons have been offered for airline tickets, based on a minimum level of investment in a bank or savings and loan. Similarly, holders of Visa cards have been offered deeply discounted or free air travel based on a certain level of activity using a general purpose charge card, or have been credited with air miles based on activity in a charge card account.

The following U.S. Patents have general pertinence to the present invention: Leon U.S. Pat. No. 4,742,457, Musmanno U.S. Pat. Nos. 4,346,442, 4,376,978, 4,597,046 and 4,774,663, Lucas U.S. Pat. No. 4,751,640, Brachtel U.S. Pat. No. 4,755,940, and Durbin U.S. Pat. No. 4,933,842. These patents relate to investment plans, allocation of investment funds among different investments and accounts, differing in liquidity and term; data processing and computerization of investment plans and electronic funds transfers, security of funds transfer arrangements and indexing of interest rates for deposit accounts. In particular, the Leon patent discloses a system for adjusting for inflation in deposit accounts and loan funds, with associated automated data processing.

Another investment offering having some relevance to the present invention is Citibank's CITI Credit Card Fund, "units" of which are sold to the public through brokers. Like a type of revenue bond, the investment guarantees a fixed rate of return. Citibank uses the invested funds to finance the purchases and cash advances of its credit card customers, and the customer's investments are secured by the card account receivables, at 100+%.

It is an object of this invention to provide a system for enabling a marketer of goods or services, a general purpose credit card firm such as Visa or MasterCard, or another similarly situated entity to offer an attractive incentive to customers toward use of a general purpose credit card, the purchase of goods, the purchase of services, or other financial activity which costs the offering entity far less than promotional schemes or arrangements conventionally used; and it is a related object to offer a consumer an attractive and safe investment opportunity in return for the purchase of goods and services.

SUMMARY OF THE INVENTION

In accordance with the present invention, a method and system used by a seller of goods or services, or by a financing entity such as a general purpose credit card firm, provides a high rate of return for investors/customers while promoting purchases by the customers of products or services from or through the offering entity. The offering entity, which is in the business of accepting purchases by customers (or accepting some form of account activity), calculates the sum of total purchases made by the customer during a preselected period, or in some cases, records only a single large purchase. The offering entity then accepts investment funds from the investor/customer up to a prescribed, pre-agreed proportion of the sum of purchases made by the investor/customer during the preselected period. The firm may provide a deposit account for the investor/customer, crediting the investment funds received from the investor in the deposit account, along with interest which accrues at a relatively high rate.

By this system, a firm promoting goods and services is able to offer an attractive, safe and liquid investment opportunity to customers in return for the customer's making purchases. The customer receives a rate of return considerably higher than available in money market accounts, certificates of deposit, or other relatively safe investments, and in fact the investment provided under this system is more liquid than most investment programs claiming to give a high yield.

The customer can withdraw his invested funds plus interest on demand, preferably by giving a fixed period of notice. If the firm loses money on these incentive accounts, the firm generally will wish to limit the duration of each investment of funds, or to limit the period of time in which the high rate is paid.

However, the offering entity will not necessarily have a loss for the incentive investment accounts, or may have only a small loss. In most cases the firm will be large, with substantial assets, and will be able to obtain among the highest rates of return available when reinvesting these funds; the rate may be comparable to the rate paid to the investors. Moreover, even if the offering entity incurs a small loss (e.g. one-half percent) through the offering of very attractive return, the cost incurred will still be lower than many previously used promotional programs used by Visa, MasterCard, airlines, rental car companies, etc. Compared to the amount of the customer's purchases, and with a 10% limit on investment as compared to purchases, the loss to the offering entity in this example would be only 1/20 percent.

Further, the system of the invention can cooperate particularly well with general purpose credit card accounts such as Visa, MasterCard, American Express and Discover. Investment funds from customers can be used to finance the offering entity's own customer credit card accounts, thus earning a return for the offering entity higher than would be available elsewhere with relative security and enabling the entity to make a profit rather than incur a loss.

Examples of published interest rates to which is tied the interest rate to be offered customers are the prime rate for large banks; average large bank prime rate when several are published; government bills, less than two years; federal funds rate at which banks borrow from the government; term federal funds; bankers' acceptance (backed by letters of credit); Libor-London Interbank offering rate/international cost of funds; commercial paper; certificates of deposit; government bonds; and government notes. The large bank prime rate is an interest rate with which many investors are familiar, and is preferred.

The attractive investment rate offered to customers/investors can be, for example, zero to four percent above the published money rate selected. An example would be one-half percent or one percent over the prime rate or its equivalent, or the prime rate itself. Another example would be two to three percent over a published certificate of deposit (CD) rate (such as published in *The Wall Street Journal*). In many cases certificates of deposit rates are more familiar to and more meaningful to customers; also, the investment contemplated by the invention is in competition with and will usually be compared with CD rates, by the investor.

The system of the invention preferably includes automated data processing of customer/investor transactions. A central computer and database can automatically set up an account for an investor, make computations regarding amount of investment funds that will be accepted for each customer account in each billing period, compute interest, print offering materials, calendar investments so as to require liquidation after a certain agreed-upon period, etc. These functions overlap to a large degree with functions already performed internally by Visa, MasterCard, American Express, telephone companies and other businesses offering credit to consumers.

For security to the customer/investor, the deposit account can be insured, or it can be secured by assets of the offering entity, e.g. charge account receivables in the case of a department store or general purpose credit card.

The system and method of the invention therefore achieve for the offering entity a relatively inexpensive vehicle for attracting customers to purchases of goods or services, while at the same time promoting savings. From the point of view of the customer, a very high rate of return can be achieved in a safe and liquid investment, with a firm or institution which the customer knows to be reliable, and the customer is encouraged to use his credit card, purchase department store items or appliances, automobiles, etc. as well as to increase savings. These and other objects, advantages and features of the invention will be apparent from the following description of preferred embodiments, considered along with the accompanying drawings.

DESCRIPTION OF THE DRAWINGS

FIG. 5 shows a statement wherein no maximum term is imposed, but the interest rate drops to a lower level after a pre-set period such as one year.

DESCRIPTION OF PREFERRED EMBODIMENTS

Figure 1:
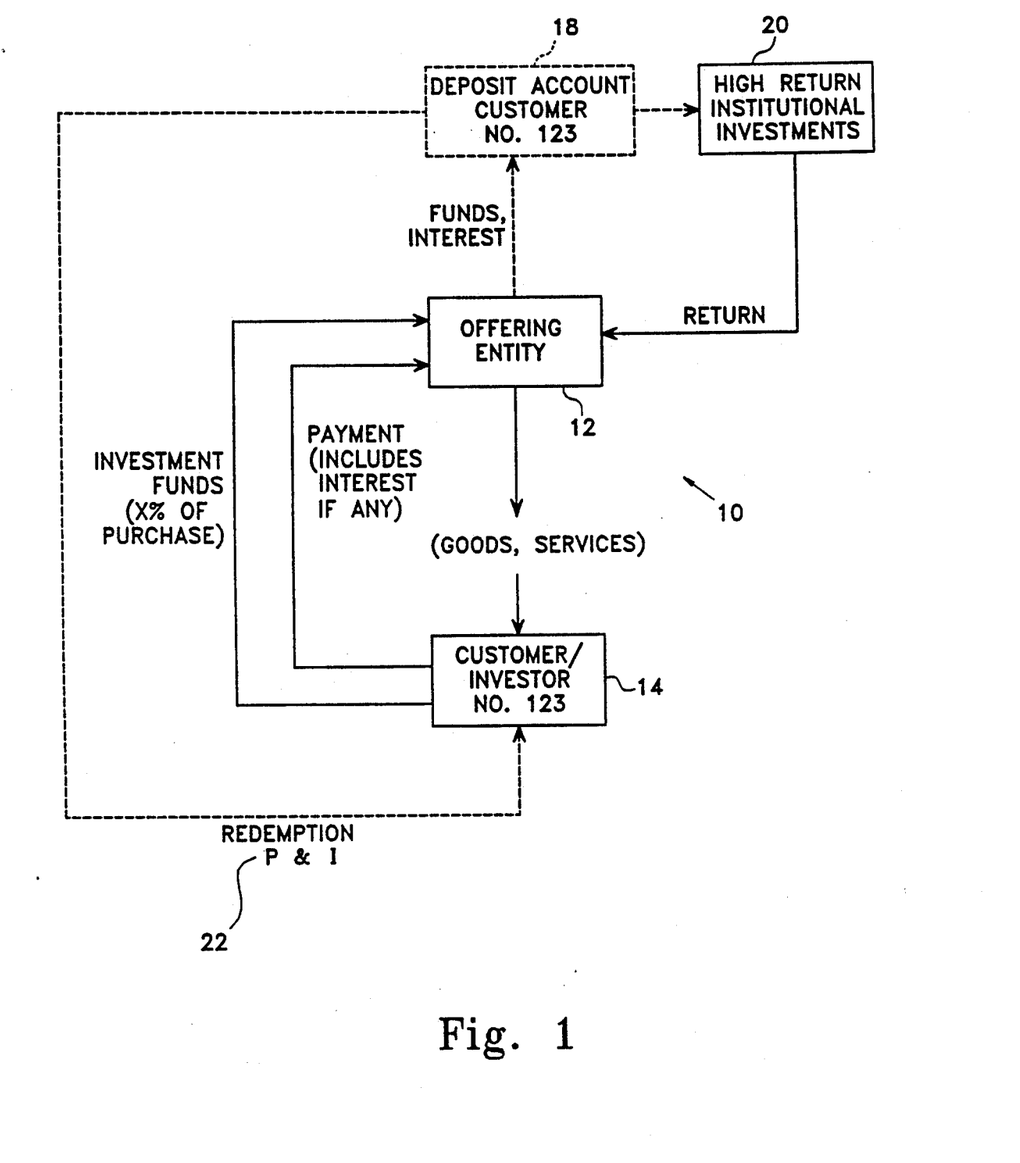
FIG. 1 is a block diagram diagrammatically illustrating the system of the invention in one embodiment, illustrating flow of goods or services, payment, investment funds, interest and reinvestment activity by the selling/offering entity.

In the drawings, FIG. 1 shows in block diagram form a system generally identified as 10 for use by a seller of goods or services to provide an incentive to customers to make purchases. In the system 10 of the invention an offering entity 12 can be, for example, an automobile manufacturer, a department store, a provider of telephone services, a hotel, rental car company, etc. As indicated in the drawing, the offering entity 12 provides goods and/or services to the customer 14, and this can include credit on purchases. The drawing shows the flow of payments from the customer 14 to the offering entity or firm 12 and, as indicated, this will include interest if interest is charged, such as in a "revolving" credit type account.

The drawing also shows the flow of investment funds from the customer 14 to the offering entity 12. As discussed above, the amount of these investment funds can be limited to a fixed percentage of the amount of purchase activity by the customer during a particular period or for a particular transaction in the case of the purchase of an automobile, for example. Thus, if the customer has purchased $1000 of goods and services from a department store, for example, during a specific billing period (or during a longer preselected period which may encompass several billing periods), and the investment percentage amount is set at 10%, the customer may invest $100 with the offering entity for the period in question. If the customer pays the entire bill for purchases, $1100 may be remitted, with instructions (preferably on a provided form) that $100 is to be placed in the investment account for the customer. As noted above, the offering entity 12 offers a high rate of return on the investment funds, higher than available elsewhere in safe, liquid investments at the retail level. The customer will find a significantly higher rate of return with this program than available in "money market" accounts, certificates of deposit or other short to medium term liquid safe investments.

The offering entity establishes a deposit account 18 for the customer/investor 14, preferably using a dedicated account number which is tied to the customer (the customer is identified as number 123 in FIG. 1). In any event, the deposit account balance and other information is tied to the customer's regular account number or to a transaction number in the case of a single-purchase of goods or services.

If the offering entity is a single department store (as opposed to a group of different stores or firms selling a variety of goods and/or services), the period for accumulation of purchases may advantageously be longer than the case of a general purpose credit card, since the monthly purchase amounts will usually be less. Thus, a department store may offer an investment based on six months' total purchases to make investment amounts more significant.

Of course, the customer's deposit account 18 will exist as part of a pool of funds from all customers/investors and the account 18 will exist only in a central computer database and in statements issued from the offering entity. The offering entity uses these funds for reinvestment to obtain maximum secure return, or otherwise uses the funds advantageously as limited by applicable laws and regulations regarding financial institutions, general purpose credit card companies, etc. The block 20 in FIG. 1 indicates investment of funds by the offering entity, with return of interest.

As outlined earlier, because the offering entity can have a small loss on the purchase incentive/investment program of the invention, it may wish to limit the duration of investment of each increment of funds invested by each customer. The term can be, for example, six months, one year, several years, or up to a fixed end date but with a guarantee of a minimum term of, for example, six months. For example, each customer deposit account may be automatically liquidated at July 31 and December 31 of each year, but only for funds that have been in the account for at least six months at the particular liquidation date. Liquidation or redemption of investment funds is indicated at 22 in the drawing, with principal and interest paid back to the customer/investor. If the entire account is not liquidated, then only those portions of investment funds scheduled to be liquidated at the particular time will be sent to the customer, with later-invested funds remaining in the deposit account 18.

Figure 2:
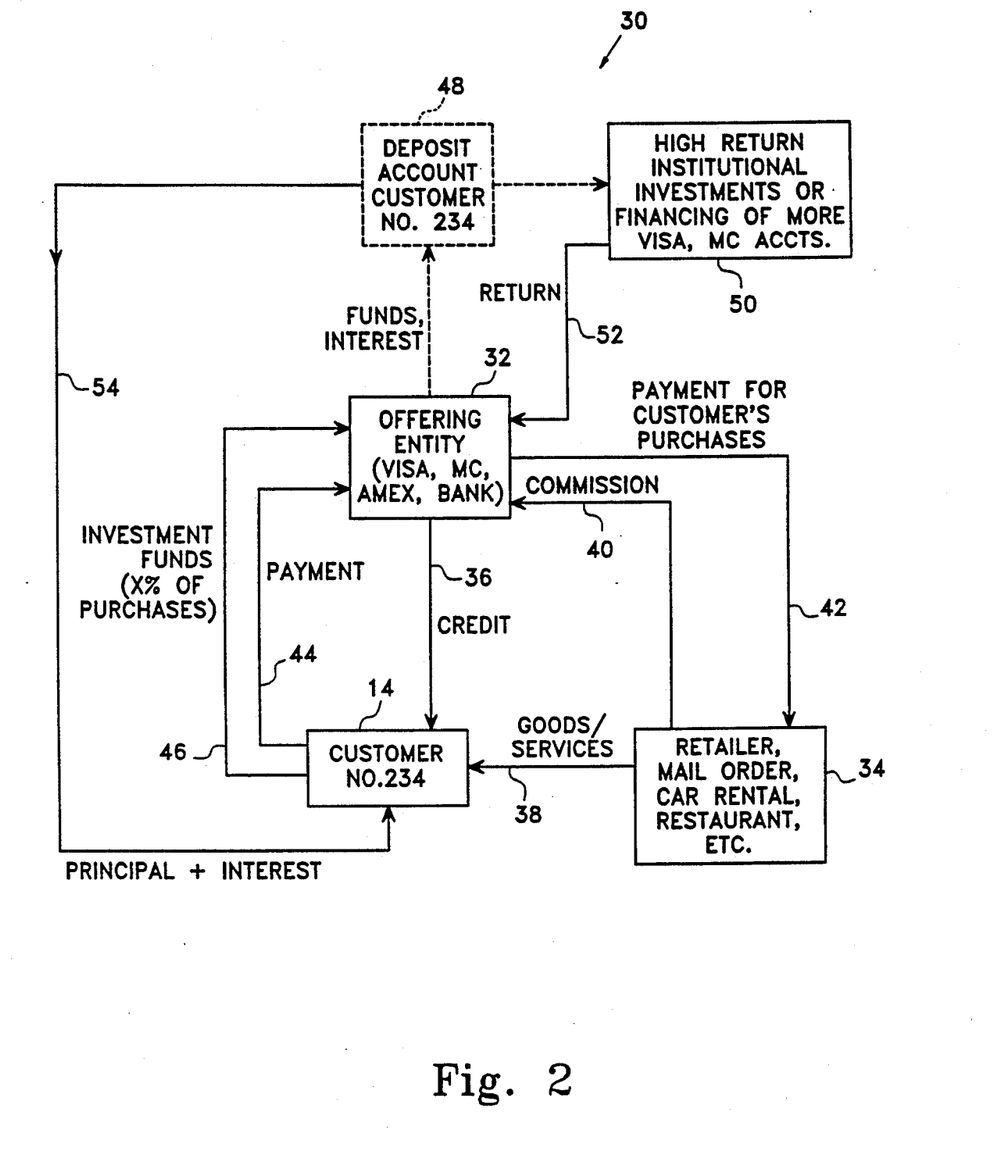
FIG. 2 is a block diagram similar in basic respects to FIG. 1, but showing the system as applied to a credit card account wherein the offering agency primarily offers credit, but the goods and services come from other sources under agreement with the offering agency. Examples are a Visa, MasterCard or other general purpose credit card account. The credit card account may or may not be a revolving type charge account.

FIG. 2 shows a system of the invention similar to that of FIG. 1, but in this case reflecting that the offering entity in the system 30 may be a general purpose credit card firm offering a widely accepted credit card, such as Visa, MasterCard or American Express. In this case, the offering entity 32 does not normally provide goods or services (except credit services), the actual provider of goods or services being a retailer 34 or mail order firm or other supplier of goods or services to the public.

Thus, the offering entity 32 provides credit to the customer/investor 14, indicated by the arrow 36, while the customer obtains goods or services from the retailer 34, indicated by the arrow 38. FIG. 2 shows commissions (typically 2% to 4%) passing from the retailer 34 via arrow 40 to the offering entity (Visa, MasterCard, etc.); and payment for the customer's purchases passing from the offering entity 32 to the retailer 34, indicated by the arrow 42.

The customer (identified as customer No. 234) remits payment to the offering entity (arrow 44) and may also invest funds (arrow 46) with the offering entity as a pre-agreed percentage of purchases made.

Again, the offering entity establishes a deposit account 48 for the customer, the deposit account being shown in dashed lines because the funds are actually part of a pooled fund. The offering entity 32 actually invests these investment funds, for example in high return institutional investments 50, which provide a return to the offering entity indicated at arrow 52.

For example, a situation may exist wherein the prime rate for large banks is at 8%, and wherein the best secure and liquid investment available to the average consumer has a rate of return of about 5% to 6%. Bank savings account rates in such an investment climate may be only about 4½% to 5¼%. The offering firm 32 might offer the customer a rate of return of 7½%, 8%, 9%, 10% or even 11% or higher, limiting the amount of each investment to, for example, 10% of the purchases made by the customer during a given billing period (this percentage may be higher depending on the offering entity, its own return on investments 50, the duration over which high interest is payable, and other factors). A strong incentive is therefore provided for the customer to make purchases using a credit card account with the offering firm, especially if the customer can pay the account in full after each billing period. In this situation, instead of buying items or services for cash, the customer can use the credit card account, obtain an extension of credit for a minimum of about 25 days, and can also reap the benefits of a very high rate of return on investment funds.

On the other hand, the offering firm 32 obtains a higher activity in the customer's credit card account, and, even if the customer pays the full balance every month, the offering entity receives substantial commissions from the retailer 34. (Of course the customer can allow the credit account to "revolve", by not paying the full balance each billing period. However, in nearly every case this will not be economically sound since the interest charges of the offering firm 32 in the customer's account will be greater than the interest offered via the customer's deposit account 48).

As indicated in FIG. 2, the offering entity 32 ultimately liquidates the customer's investment, shown by the arrow 54, by turning over principal and interest to the customer 14. If the customer has an outstanding balance in the credit card account, or if the customer is in arrears on payment, or if the customer so desires, the payment of principal and interest can be via credit to the customer's credit card account, rather than by direct payment.

It should be pointed out that a general purpose credit card offering entity as indicated at 32 (and as described previously) will generally be a bank rather than Visa International, which is primarily a computer service company and licensing agency. The bank offers a Visa card or MasterCard under an "interchange agreement" with the organization such as Visa International. The bank's processing center has a computer communicating with a central Visa computer. Statements are sent to the customer by the bank, but the Visa computer has all relevant data and charges the bank a fee based on volume and the number of services provided. Thus, Visa benefits from the system of the invention, although the bank benefits more directly and generally more substantially. American Express is different in that it offers cards directly, not through banks.

An organization such as American Express or a bank issuing Visa cards and MasterCards is in a good position to offer the system of the invention. If the organization collects interest from customers for extension of credit, it has the opportunity to obtain a high rate of interest from customers who do not pay the entire balance each month. Thus, banks issuing Visa cards or MasterCards, for example, can use customer-invested funds to finance additional credit card accounts. A large proportion of customers with these credit card accounts will carry a revolving balance and will pay high interest (e.g. 14%-19%) for the financing of those accounts. Therefore, such an organization has an opportunity to make an investment 50 which potentially can return more to the offering organization than the offering organization must pay to those customers who take advantage of the investment offer.

Figure 3:
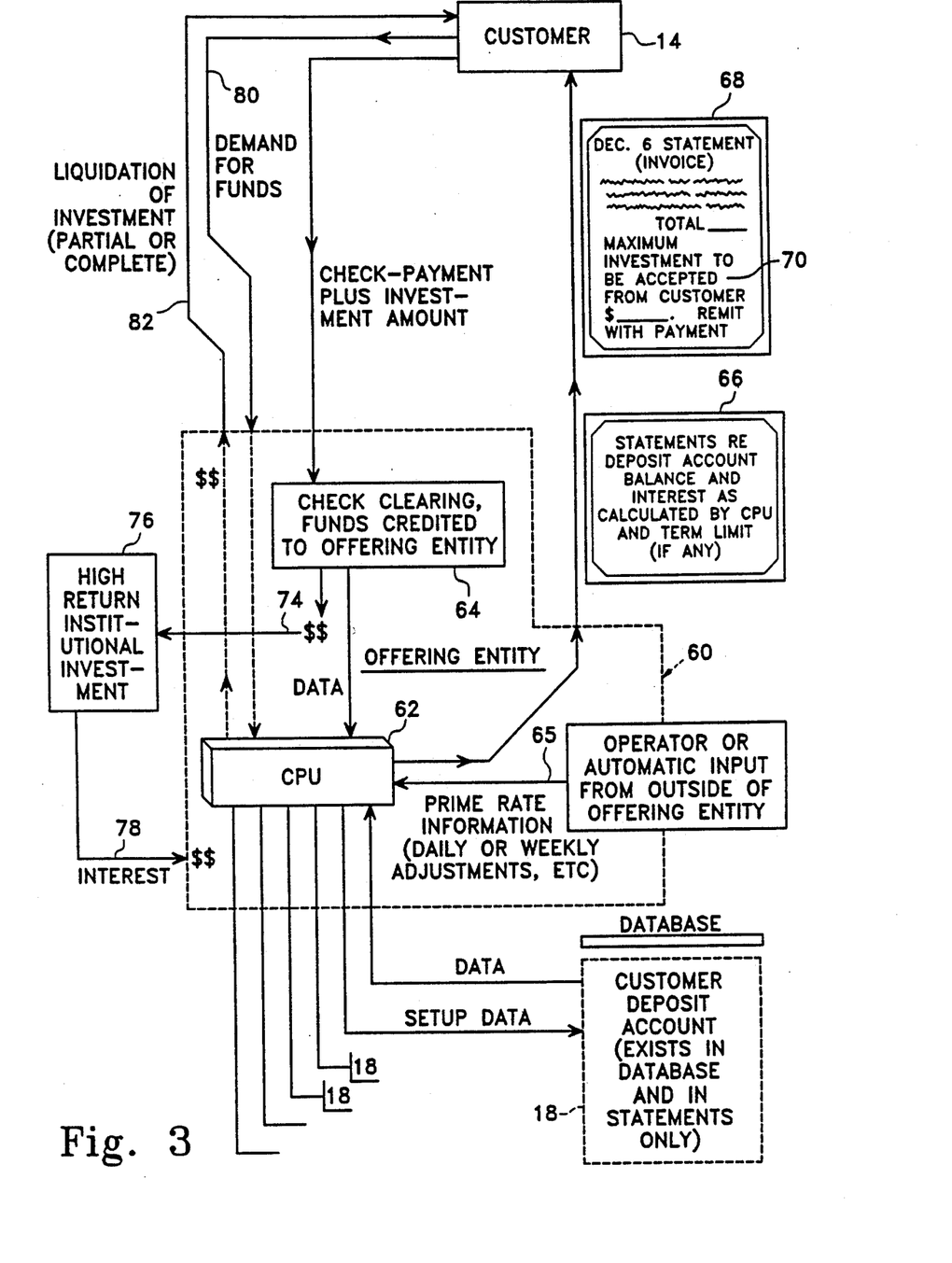
FIG. 3 is another schematic diagram in the form of a block diagram/flow chart showing the operation of the system from the point of view of the offering firm or entity. The figure shows data processing steps, accomplished using a central processor or CPU, involved in setting up a customer deposit account, accepting funds up to the preset percentage limit, issuing statements, limiting the term of each increment of investment funds, calculating interest, etc.

FIG. 3 is a simplified flow chart showing the operation of the system of the invention by the offering firm or entity. The offering entity is indicated in a dashed line box as 60, encompassing a central computer or central processing unit 62 as well as a function box 64 indicating check clearing and crediting of funds to the offering entity from the customer 14. An arrow at 65 indicates input of information regarding the current large bank prime rate (or other published interest rate as selected for use in the system, with adjustment daily, weekly, or over another selected period of time. The offering entity 60 will of course encompass many additional features, functions, departments and personnel; FIG. 3 only indicates certain functions related to the system of the invention, sufficient to describe the operation of the system by the offering entity 60.

As can be seen from FIG. 3, the central computer or CPU 62 establishes or coordinates with the establishment of many customer deposit accounts 18, in a database. Several customer deposit accounts 18 are indicated in FIG. 3, but there could be hundreds or thousands of such accounts. The account 18 is shown in dashed lines, since it will normally only exist in the computer database, in statements sent out to the customer, other internal records, etc.

FIG. 3 also shows the CPU 62 issuing or causing the issuance of statements 66 to the customer 14, as well as invoices or periodic account statements 68, at appropriate times. The invoice or account statement 68, in the case of a monthly charge account or other periodic account, will inform the customer of purchases made during the accounting period and the balance due and amount payable by the customer. In addition, the monthly or periodic invoice or statement 68 in preferred embodiments of the invention will indicate to the customer the maximum investment that can be made by the customer for the particular period and which will be accepted from the customer for investment in the offering entity, at a stated high rate of return; alternatively, this can occur less frequently, such as every six months, but with the relevant purchase accumulation given each statement. The customer can be invited to send a single check, with designation of what portion is to make payment of or on the balance due, and what portion is to be applied as investment funds. The offer presented to the customer is indicated at 70 on the invoice 68 in FIG. 3.

The deposit account statement 66 should indicate any term limit on the invested funds, if any is imposed by the offering entity. In the event the customer has sent in various increments of investment funds for different periods, received by the offering entity and credited to the deposit account 18 at different times, the statement 66 can give a schedule of dates for liquidation of each increment of funds making up the current balance. This is discussed further below with reference to FIG. 4.

As mentioned above and as indicated in FIG. 3, the CPU 62 may issue or direct the issuance of separate statements 66 to the customer 14, regarding the balance in the customer's deposit account 18. These statements will include an accounting of compounded interest as calculated by the CPU 62. Although the statement 66 could be physically combined with the periodic account statement 68, it will be preferably in most instances to have a separate statement 66, even if they are mailed together in the same envelope. For example, there could be periods where a statement 66 is sent out to report deposit account balance, when no periodic account statement 68 is sent. This would be the case with firms which mail a statement only when some balance is due. Even in such periods, the customer may have an existing deposit account balance from investment funds sent in previously.

FIG. 3 further indicates the investment of funds by the offering entity, i.e. funds which have been invested by a number of customers 14. The arrow 74 in FIG. 3 indicates funds being invested in a high return institutional type investment 76. Such investment pays a return of interest 78 back to the offering entity as schematically shown.

Also shown in the schematic view of FIG. 3 is a demand for funds by the customer 14, indicated at 80 in the figure. At any time, preferably with a prescribed period of notice (such as one month), the customer 14 may demand principal and interest, or a portion of principal and interest, from his customer deposit account 18. Such demand does not come into play if the offering entity has imposed a maximum investment term in which interest is paid, and no demand is made by the customer prior to the imposed end of the term, in which case the account is liquidated automatically. The customer's demand 80 is fed by the offering entity 60 into the CPU 62, which automatically carries out steps such as those of verifying the customer's deposit account balance, calculating all compounded interest which should be credited to the customer's balance to date, matching the account number and any security code which is required, automatic verification of signature or checking that manual verification has been performed, compiling a closing statement or a status-bearing statement regarding the deposit account following withdrawal of the demanded funds, and finally, issuance of and mailing of a check to the customer 14, as indicated by the arrow and legend 82.

Figure 4:
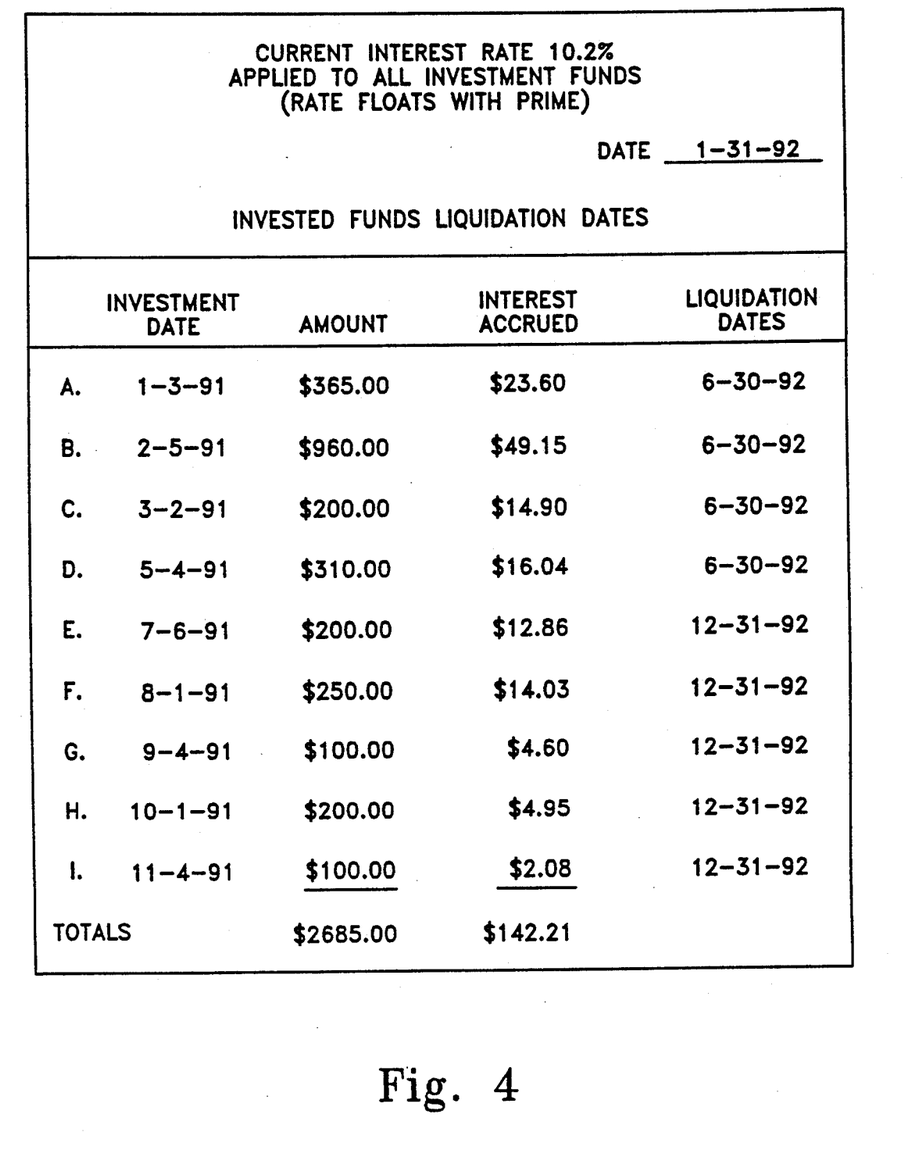
FIGS. 4 and 5 show examples of statements that can be sent to the customer detailing the customer's deposit account and the progress of all investment increments in the account, as interest is applied to each of these increments of funds. The statement of FIG. 4 reflects an investment account in which the term is limited for each increment of funds.

FIG. 4 shows a portion of the statement regarding the liquidation dates of a series of increments of customer-invested funds, and also listing interest accrued at the date of the statement. The example of FIG. 4 assumes that the interest rate applied to all funds will float in accordance with a fixed increment over the published money rate which is used in the system, e.g. the prime rate (the figures are fictional and not necessarily correct). However, each increment of funds could instead be guaranteed the interest rate prevailing at the time the funds are invested, so that, potentially, each increment of funds could carry a different interest rate for the life of the investment. Interest may or may not be compounded, depending on the offer to the customer.

Figure 5:
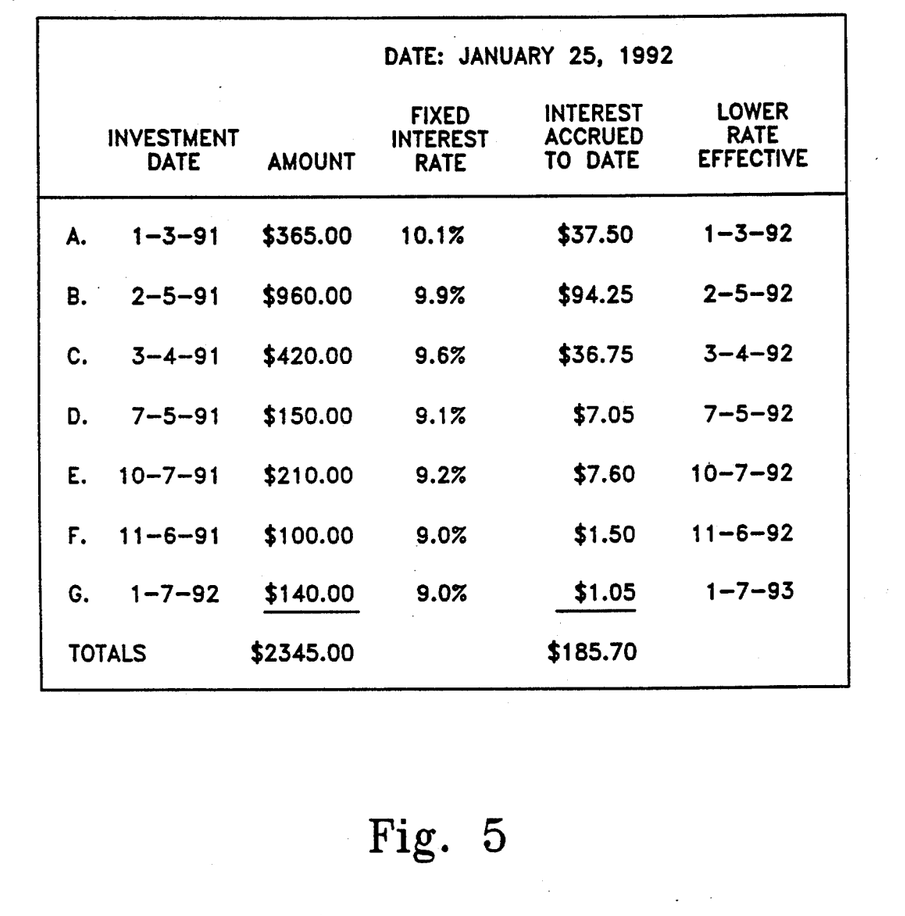

As a further alternative, the system can guarantee the customer a fixed rate of return, at the level prevailing at the time of investment, but guarantee this return only for a limited term, such as one year. In this way, limitation on the term of investment need not be imposed, and the customer can maintain a deposit account with the subject funds retained indefinitely, but with a lower rate of interest paid after the expiration of the original promised high-interest duration for the subject incremental investment. FIG. 5 shows an example statement 86 for the latter alternative (again with arbitrary figures). After the promised period of high interest has expired for a given increment of funds, the interest rate paid can drop to, for example, a point or more below prime rate. The customer may then wish to withdraw those funds not subject to the higher rate of return, but in many cases, even though notified, the customer will not do so immediately. This will provide opportunity for the offering entity to earn a positive return from the customer's invested funds that have passed the high-interest period.

In the system as exemplified by FIG. 4, the customer's statement 84 shows incremental investments A through I, made, as received by the offering entity, from Jan. 3, 1991 to Nov. 4, 1991. The statement 84 in the illustrated example gives the date and amount of each incremental investment, along with the amount of compounded interest accrued to date for those particular funds. On the right, the statement gives the required liquidation date for each incremental investment. Although this is only one example of how the limitation of the high-interest investment can be effected, the statement 84 reflects a system in which the customer is guaranteed at least one full year of the high return investment for each incremental investment, but with liquidation only occurring twice per year, at June 30 and December 31. Thus, funds invested by the customer just after December 31 can obtain the high rate of return, in this example, for almost a year and a half.

FIG. 5 reflects the variation discussed above, wherein the customer is given the benefit of the prevailing high rate of interest at the time of investment of each segment of funds, as a fixed rate which follows those funds throughout the term. In this example, however, the fixed rate of return is effective for only a fixed period of time, e.g. one year in the example illustrated (again, interest may or may not be compounded). Thus, there need be no mandated liquidation date for each increment of funds—as discussed above, the customer can keep the funds invested as long as desired, but the lower rate (e.g. one percent below prime) will be effective after the expiration of the high-return period.

In another variation discussed above but not specifically shown in the statements of FIGS. 4 and 5, if the offering entity is a single business or firm such as a department store chain, a rental car firm, etc., the customer may have the opportunity to invest funds less frequently, such as every six months or every year, based on purchases/account activity over that period. The statement will reflect this less frequent investment and will appear simpler.

The above described preferred embodiments are intended to illustrate the principles of the present invention, but not to limit its scope. It can be seen that in a number of aspects of the system described, several alternatives are possible, still within the overall system and principle described. Other embodiments and variations to these preferred embodiments will be apparent to those skilled in the art and may be made without departing from scope of the invention as defined by the following claims.

I claim:

1. A method used by an offering entity such as a seller of goods or services or a firm financing goods and services, for using a computer having a memory with associated data processing means to create and operate investment accounts for investors/purchasers and to provide an attractive rate of return for the investor/purchaser in such investment account while also promoting purchases by the investor/purchaser of products or services from or through the offering firm or entity, comprising:

(a) selecting an interest rate and entering and storing the selected interest rate into the memory of the computer, (b) each time the investor/purchaser makes a purchase from or through the offering entity, entering and storing a record of the purchase in the computer memory, including the date and the amount of the purchase, (c) using the data processing means of the computer, automatically calculating a sum of total purchases made by the investor/purchaser during a preselected period, (d) under the control of the computer, automatically calculating a prescribed proportion of the sum of total purchases made by the investor/purchaser during the preselected period, and automatically issuing a statement to the investor/purchaser for the preselected period, indicating said prescribed proportion of the sum of total purchases as a maximum amount which can be received from the investor/purchaser as an investment.

(e) accepting investment funds from the investor/purchaser up to said prescribed proportion of the sum of total purchases and entering and storing the amount of said investment funds into the computer memory and, under the control of the computer, creating a deposit account for the investor/purchaser in the computer memory and crediting such investment funds in the deposit account of the investor/purchaser in the computer memory, (f) under the control of the computer, automatically accruing interest for the investor/purchaser in the deposit account by automatically calculating interest due based on the amount and date of investment funds in the investor/purchaser's deposit account in the computer memory, by applying said selected interest rate stored in the computer memory, and (g) at a time when the investor/purchaser's deposit account is to be liquidated, using the computer to automatically determine an amount of principal and accrued interest due the investor/purchaser based on amounts and dates stored in the deposit account in the computer memory, and paying the investor/purchaser such determined amount.

2. The method of claim 1, further including entering and storing into the memory of the computer a specific term of investment limiting the time within which said interest rate will be paid on investment funds from the investor/purchaser.

3. The method of claim 1, wherein the steps of selecting and entering and storing an interest rate comprise selecting an interest rate which has a preselected relationship to a published money rate.

4. The method of claim 3, further including entering and storing updated, revised interest rates as said interest rate, with period changes in said published money rate.

5. The method of claim 1, further including, using the computer, automatically and periodically issuing statements to the investor/purchaser showing balance in said deposit account.

6. The method of claim 1, wherein step (g) is implemented by the computer after input to the computer of a demand from the investor/purchaser for the deposit account funds.

7. The method of claim 1, concluding the further step of repeatedly entering into the computer memory updated information concerning an account balance owed by the investor/purchaser for the purchase of products or services, and wherein the step of paying the investor/purchaser is not executed by the computer until the account balance of the investor/purchaser has been fully paid.

8. A system comprising a computer and associated data processing programming and data storage, used by an offering entity such as a seller of goods or services or a firm financing goods and services, for promoting saving by providing an attractive rate of return for investors/purchasers while promoting purchases by the investors/purchasers of products or services from or through the offering entity or firm, comprising:

central computer means with associated data storage means, data processing means and data input means, data including an interest rate stored in the data storage means, being an attractive interest rate to individual investors, the data input means including means for receiving inputs of updated interest rates when appropriate, the central computer means including purchase tabulating means for automatically receiving and entering into the data storage means records of purchases made by an investor/purchaser from or through the offering entity or firm during a preselected period, and for calculating a sum of total purchases made during such preselected period, the data storage means having stored a prescribed, preselected proportion or percentage figure for use in inviting an investor/purchaser to invest funds, the central computer means including means for applying said proportion or percentage figure to the sum of total purchases calculated by the central computer means to produce an investment maximum for the preselected period as a proportion of the sum of total purchases for the preselected period, and means for automatically issuing to the investor/purchaser a statement showing said investment maximum for funds that will be accepted from the investor/purchaser based on purchases made in said preselected period, deposit account means in the central computer means for establishing and maintaining a deposit account as data in the data storage means, for the investor/purchaser, investment accepting means in the central computer means, for accepting and storing in the data storage means records of investment funds received from the investor/purchaser up to said investment maximum for the preselected period, including means for automatically comparing the amount of funds received from the investor/purchaser with said investment maximum to determine whether the funds are acceptable, and for automatically crediting such investment funds in the investor/purchaser's deposit account in the data storage means up to the investment maximum for the preselected period, interest calculating means in the central computer means, for accruing interest for the investor/purchaser in the deposit account at said interest rate stored in the data storage means, statement means in the central computer means for issuing account statements for the investor/purchaser reporting principal and accrued interest in the deposit account of the investor/purchaser.

redemption means in the central computer means for issuing payment to the investor/purchaser for principal and accrued interest after one of the following events:
  (a) entry into the central computer means of a demand by the investor/purchaser
  (b) termination of a prescribed term of investment which has been stored in the data storage means.

9. The system of claim 8, wherein said interest rate is an interest rate having a preselected relationship to a published money rate.

10. The system of claim 8, wherein the offering entity or firm comprises an issuer of general purpose credit cards.

* * * * *